(12) United States Patent
Jiang et al.

(10) Patent No.: US 9,766,727 B2
(45) Date of Patent: Sep. 19, 2017

(54) COMPUTER STYLUS WITH ANTENNA

(71) Applicant: Apple Inc., Cupertino, CA (US)

(72) Inventors: Yi Jiang, Sunnyvale, CA (US); Huan-Chu Huang, Luzhu (TW); Mattia Pascolini, San Francisco, CA (US); Qingxiang Li, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 100 days.

(21) Appl. No.: 14/792,516

(22) Filed: Jul. 6, 2015

(65) Prior Publication Data
US 2017/0010697 A1 Jan. 12, 2017

(51) Int. Cl.
G06F 3/0354 (2013.01)
G06F 3/033 (2013.01)

(52) U.S. Cl.
CPC .......... G06F 3/03545 (2013.01); G06F 3/033 (2013.01)

(58) Field of Classification Search
CPC .......................... G06F 3/03545; G06F 3/0488
See application file for complete search history.

(56) References Cited

U.S. PATENT DOCUMENTS

| 6,262,684 | B1 | 7/2001 | Stewart et al. |
| 7,646,347 | B2 | 1/2010 | Ying |
| 7,656,355 | B2 | 2/2010 | Hsin |
| 8,028,921 | B2 | 10/2011 | Silverbrook et al. |
| 2006/0197755 | A1* | 9/2006 | Bawany ............ G06F 1/266 345/179 |
| 2008/0094292 | A1 | 4/2008 | Su |
| 2011/0133997 | A1 | 6/2011 | Lee |
| 2013/0207925 | A1 | 8/2013 | Ryshtun et al. |
| 2013/0234998 | A1 | 9/2013 | Wang et al. |
| 2013/0241795 | A1* | 9/2013 | Sung ............... H01Q 1/50 343/861 |
| 2014/0255899 | A1* | 9/2014 | Poullain ............ G06F 1/1616 434/351 |
| 2015/0116291 | A1 | 4/2015 | Leung et al. |

(Continued)

FOREIGN PATENT DOCUMENTS

EP 2234202 A1 9/2010
WO 2010128942 11/2010

OTHER PUBLICATIONS

Coutts et al., U.S. Appl. No. 14/307,257, filed on Jun. 17, 2014.

Primary Examiner — Gerald Johnson
(74) Attorney, Agent, or Firm — Treyz Law Group, P.C.; G. Victor Treyz; Michael H. Lyons

(57) ABSTRACT

A computer stylus may have an elongated body with a tip and an opposing end having components such as a connector and an antenna. Metal structures for the antenna may be supported using a molded plastic support with metal traces or may be formed using flexible printed circuits or other structures. Metal and plastic tubes may be used in forming the body of the stylus. A metal tube may have an opening in which an antenna is mounted. A plastic tube may serve as an outer housing for the stylus and may cover the metal tube and the opening in which the antenna is mounted. A transmission line such as a cable may be coupled to an antenna feed. The cable may pass through an opening in the metal tube and may be covered using a strip of conductive foam.

24 Claims, 23 Drawing Sheets

(56) References Cited

U.S. PATENT DOCUMENTS

2015/0138024 A1 5/2015 Kalistaja et al.
2015/0185881 A1* 7/2015 Yang .................. G06F 3/03545
　　　　　　　　　　　　　　　　　　　　455/269

* cited by examiner

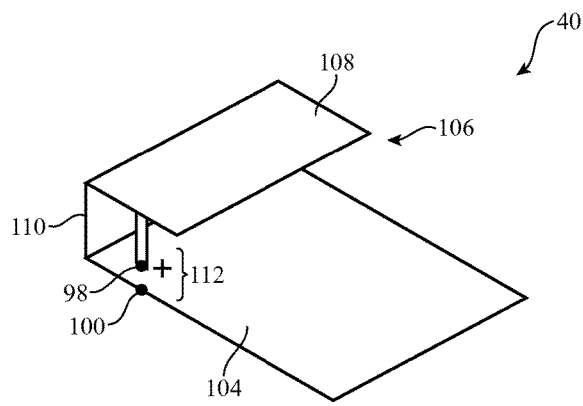
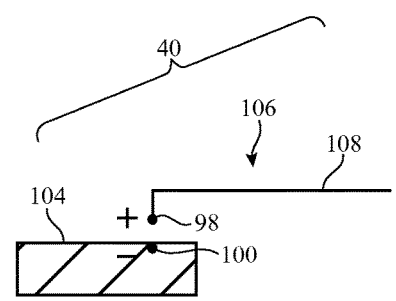
*FIG. 5*
*FIG. 6*
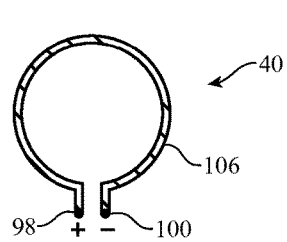
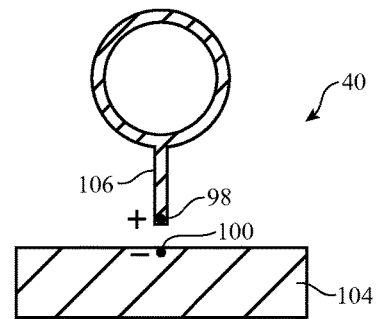
*FIG. 7*
*FIG. 8*

COMPUTER STYLUS WITH ANTENNA

BACKGROUND

This relates generally to wireless communications circuitry and, more particularly, to wireless communications circuitry for elongated wireless devices such as computer styluses.

It can be challenging to form wireless circuitry for electronic equipment. For example, it can be difficult to incorporate wireless components such as antennas into compact portable devices such as tablet computer styluses. If care is not taken, the presence of conductive structures will adversely affect antenna performance. Poor antenna performance can lead to the use of increased transceiver power and reduced battery life. Poor antenna performance can also degrade wireless functionality.

It would therefore be desirable to be able to provide improved wireless circuitry for wireless devices such as computer styluses.

SUMMARY

A computer stylus may be provided that supplies input to an electronic device such as a tablet computer. The stylus may have an elongated body with a tip and an opposing end. The opposing end of the stylus may include components such as a connector and antenna. The connector may be covered with a cap.

The antenna may be an inverted-F antenna, a ring antenna or other antenna that wraps around the body of the stylus, or may be an antenna of another type. Antenna structures may be formed on flexible printed circuits or may be formed from metal traces on plastic support structures. If desired, metal structures for an antenna may be supported using a molded plastic support that forms a three-dimensional antenna.

Metal and plastic tubes may be used in forming the body of the stylus. A metal tube may have an opening in which an antenna is mounted. A plastic tube may serve as an outer housing for the stylus and may cover the metal tube and the opening in which the antenna is mounted. An inner plastic tube may serve as a support structure for antenna traces.

A transmission line such as a cable may be coupled to an antenna feed. The cable may pass through an opening in the metal tube and may be covered using a strip of conductive foam.

BRIEF DESCRIPTION OF THE DRAWINGS

FIG. 5 is a diagram of an illustrative planar inverted-F antenna in accordance with an embodiment.

FIG. 6 is a diagram of an illustrative monopole antenna in accordance with an embodiment.

FIG. 7 is a diagram of an illustrative loop antenna in accordance with an embodiment.

FIG. 8 is a diagram of an illustrative ring antenna in accordance with an embodiment.

DETAILED DESCRIPTION

Figure 1:
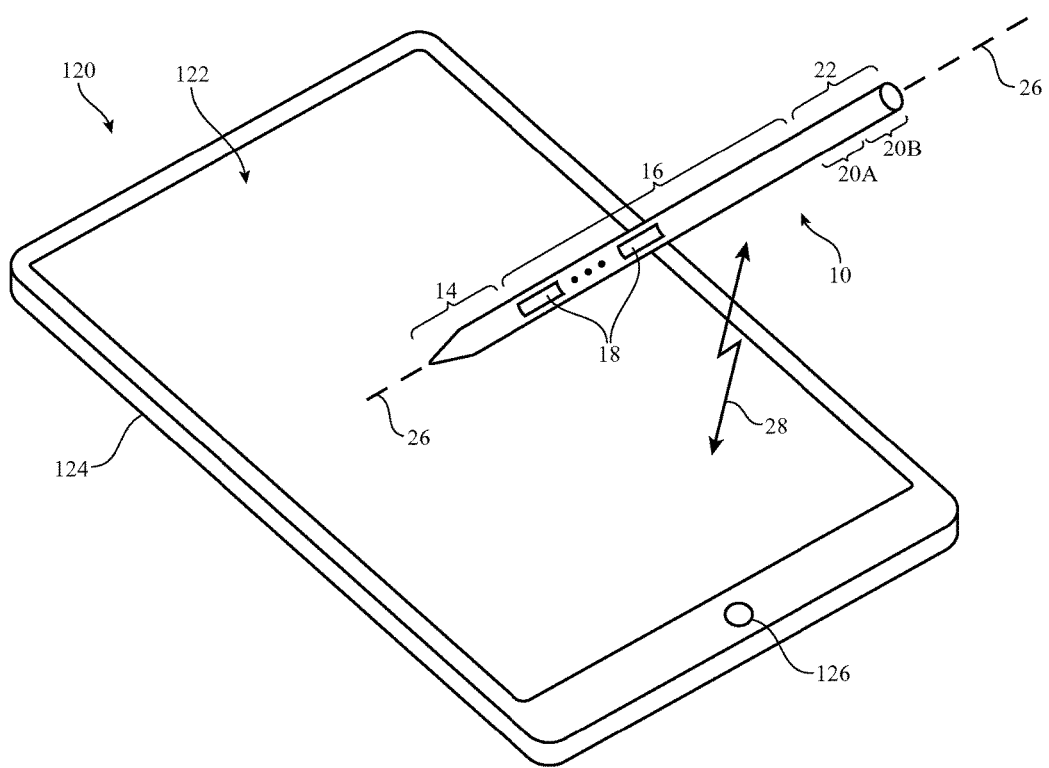
FIG. 1 is a perspective view of an illustrative computer and associated computer stylus in accordance with an embodiment.

A system that includes electronic equipment that communicates wirelessly is shown in FIG. 1. The equipment of FIG. 1 includes electronic device 120 and electronic device 10. Electronic equipment such as devices 120 and 10 may, in general, be computing devices such as laptop computers, computer monitors containing embedded computers, tablet computers, cellular telephones, media players, or other handheld or portable electronic devices, smaller devices such as wrist-watch devices, pendant devices, headphone or earpiece devices, devices embedded in eyeglasses or other equipment worn on a user's head, or other wearable or miniature devices, televisions, computer displays that do not contain embedded computers, gaming devices, navigation devices, embedded systems such as a systems in which electronic equipment is mounted in kiosks or automobiles, computer accessories such as touch pads, computer mice, computer styluses, or other electronic accessories, equipment that implements the functionality of two or more of these devices, or other electronic equipment. In the illustrative configuration of FIG. 1, which is sometimes described herein as an example, device 120 is a tablet computer or other device with a touch screen and device 10 is a computer stylus. When a drawing program is running on tablet computer 120, a user can use stylus 10 to draw on tablet computer 120 and to provide other input to tablet computer 120.

Tablet computer 120 may include a housing such as housing 124 in which display 122 is mounted. Input-output devices such as button 126 may be used to supply input to tablet computer 120. Display 122 may be a capacitive touch screen display or a display that includes other types of touch sensor technology. The touch sensor of display 122 may be configured to receive input from stylus 10.

Stylus 10 may have a cylindrical shape or other elongated body that extends along longitudinal axis 26. The body of stylus 10 may be formed from metal and/or plastic tubes and other elongated structures. Stylus 10 and tablet computer 120 may contain wireless circuitry for supporting wireless communications via wireless communications link 28. As an example, stylus 10 may supply wireless input to tablet computer 120 via link 28 (e.g., information on settings in a drawing program or other software running on tablet computer 120, input to select a desired on-screen option, input to supply tablet computer 120 with a touch gesture such as a stylus flick, input to draw a line or other object on display 122, input to move or otherwise manipulate images displayed on display 122, etc.).

Stylus 10 may have a tip such as tip 14. Tip 14 may contain a conductive elastomeric member that is detected by the capacitive touch sensor of display 122. If desired, tip 14 may contain active electronics (e.g., circuitry that transmits signals that are capacitively coupled into the touch sensor of display 122 and that are detected as touch input on the touch sensor).

Shaft portion 16 of stylus 10 may couple tip 14 of stylus 10 to opposing end 22 of stylus 10. End 22 may contain a conductive elastomeric member, active electronics (e.g., circuitry that transmits signals that are capacitively coupled into the touch sensor of display 122 and that are detected as touch input on the touch sensor), buttons, a metal connector that mates with an external plug, or other input-output components.

A force sensor may be incorporated into tip 14 and/or opposing end 22 of stylus 10. A force sensor may be used to measure how forcefully a user is pressing stylus 10 against the outer surface of display 122. Force data may then be wirelessly transmitted from stylus 10 to tablet 120 so that the thickness of a line that is being drawn on display 122 can be adjusted accordingly or so that tablet 120 may take other suitable action.

If desired, stylus 10 may be provided with a clip to help attach stylus 10 to a user's shirt pocket or other object, may be provided with a magnet to help attach stylus 10 to a magnetic attachment point in device 120 or other structure, or may be provided with other structures that help a user attach stylus 10 to external objects. End 22 may have a removable cap, a data port connector to receive a cable (e.g., a cable that supplies power signals for charging a battery in stylus 10 and/or that supplies digital data), input-output devices (e.g., a button and/or a light-emitting diode or other light-based output device), or other components (e.g., metal structures).

Components such as components 18 may be formed on stylus 10 (e.g., on shaft 16 or elsewhere). Components 18 may include buttons, touch sensors, and other components for gathering input, light-emitting diodes or other components for producing output, etc.

Stylus 10 may include a metal tube or other conductive components in shaft portion 16. The metal tube or other structures in stylus 10 may serve as an antenna ground for an antenna. An antenna resonating element for the antenna may be formed from metal traces on a printed circuit or other dielectric support structure and/or from other conductive structures. An antenna resonating element may be located in region 20B of end region 22 or may be formed at a location such as region 20A that is offset from the end of stylus 10. In configurations in which an antenna is located in offset region 20A, a connector or other components may be mounted in region 20B. If desired, antennas for stylus 10 may be located elsewhere along body 16, in tip region 14, or in other suitable portions of device 10.

Figure 2:
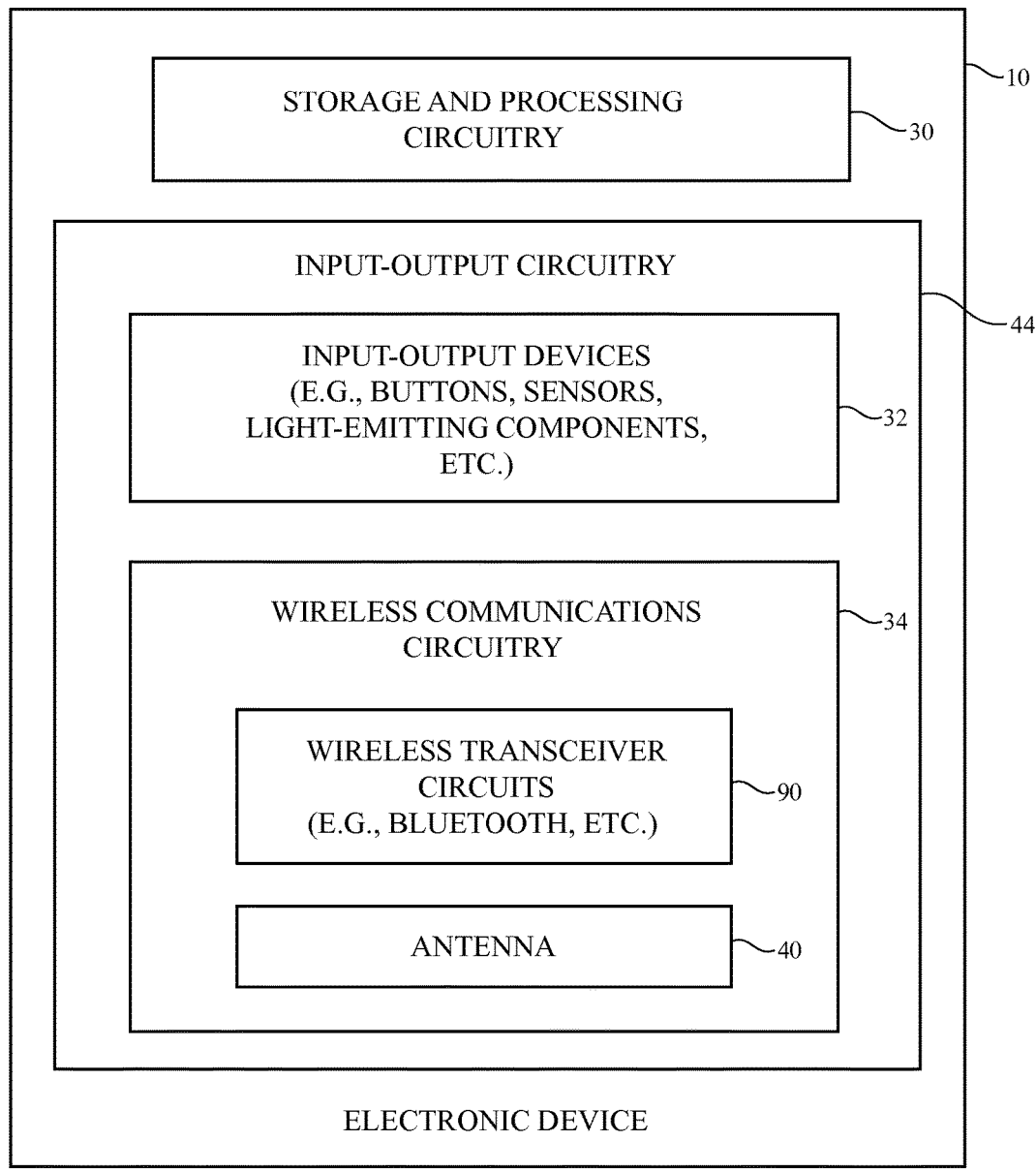
FIG. 2 is a schematic diagram of an illustrative stylus with wireless communications circuitry in accordance with an embodiment.

A schematic diagram showing illustrative components that may be used in stylus 10 is shown in FIG. 2. As shown in FIG. 2, stylus 10 may include control circuitry such as storage and processing circuitry 30. Storage and processing circuitry 30 may include storage such as nonvolatile memory (e.g., flash memory or other electrically-programmable-read-only memory configured to form a solid state drive), volatile memory (e.g., static or dynamic random-access-memory), etc. Processing circuitry in storage and processing circuitry 30 may be used to control the operation of stylus 10. This processing circuitry may be based on one or more microprocessors, microcontrollers, digital signal processors, baseband processor integrated circuits, application specific integrated circuits, etc.

Storage and processing circuitry 30 may be used to run software on stylus 10. The software may process input from buttons, sensors, and other input components. The software may also be used to provide output to a user (e.g., using light-emitting-diodes or other output components such as components 18 of FIG. 1). To support interactions with external equipment such as tablet computer 120, storage and processing circuitry 30 and other circuitry in stylus 10 may be used in implementing communications protocols. Communications protocols that may be implemented in stylus 10 include protocols for short-range wireless communications links such as the Bluetooth® protocol. If desired, other types of wireless communications links may be supported. The use of Bluetooth communications is merely illustrative.

Stylus 10 may include input-output circuitry 44. Input-output circuitry 44 may include input-output devices 32. Input-output devices 32 may be used to allow data to be supplied to stylus 10 and to allow data to be provided from stylus 10 to external devices such as tablet computer 120. Input-output devices 32 may include user interface devices, data port devices, and other input-output components. For example, input-output devices 32 may include touch screens, displays without touch sensor capabilities, buttons, joysticks, scrolling wheels, touch pads, microphones, cameras, speakers, status indicators, light sources, audio jacks and other audio port components, digital data port devices, light sensors, accelerometers or other components that can detect motion and stylus orientation relative to the Earth, capacitance sensors, proximity sensors (e.g., a capacitive proximity sensor and/or an infrared proximity sensor), magnetic sensors, and other sensors and input-output components.

Input-output circuitry 44 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas 40, transmission lines, and other circuitry for handling RF wireless signals.

Wireless communications circuitry 34 may include radio-frequency transceiver circuitry 90 for handling wireless communications in the 2.4 GHz Bluetooth® communications band or other suitable communications bands. Bluetooth signals or other wireless signals may be transmitted and/or received by transceiver circuitry 90 using one or more antennas such as antenna 40. Antennas in wireless communications circuitry 34 may be formed using any suitable antenna types. For example, antennas for stylus 10 may include antennas with resonating elements that are formed from loop antenna structures, patch antenna structures, inverted-F antenna structures, slot antenna structures, planar inverted-F antenna structures, helical antenna structures, ring antennas, monopole antennas, hybrids of these designs, etc. If desired, one or more of the antennas in stylus 10 may be cavity-backed antennas.

Transmission line paths may be used to couple antenna 40 to transceiver circuitry 90. Transmission lines in stylus 10 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within the transmission lines, if desired.

Figure 3:
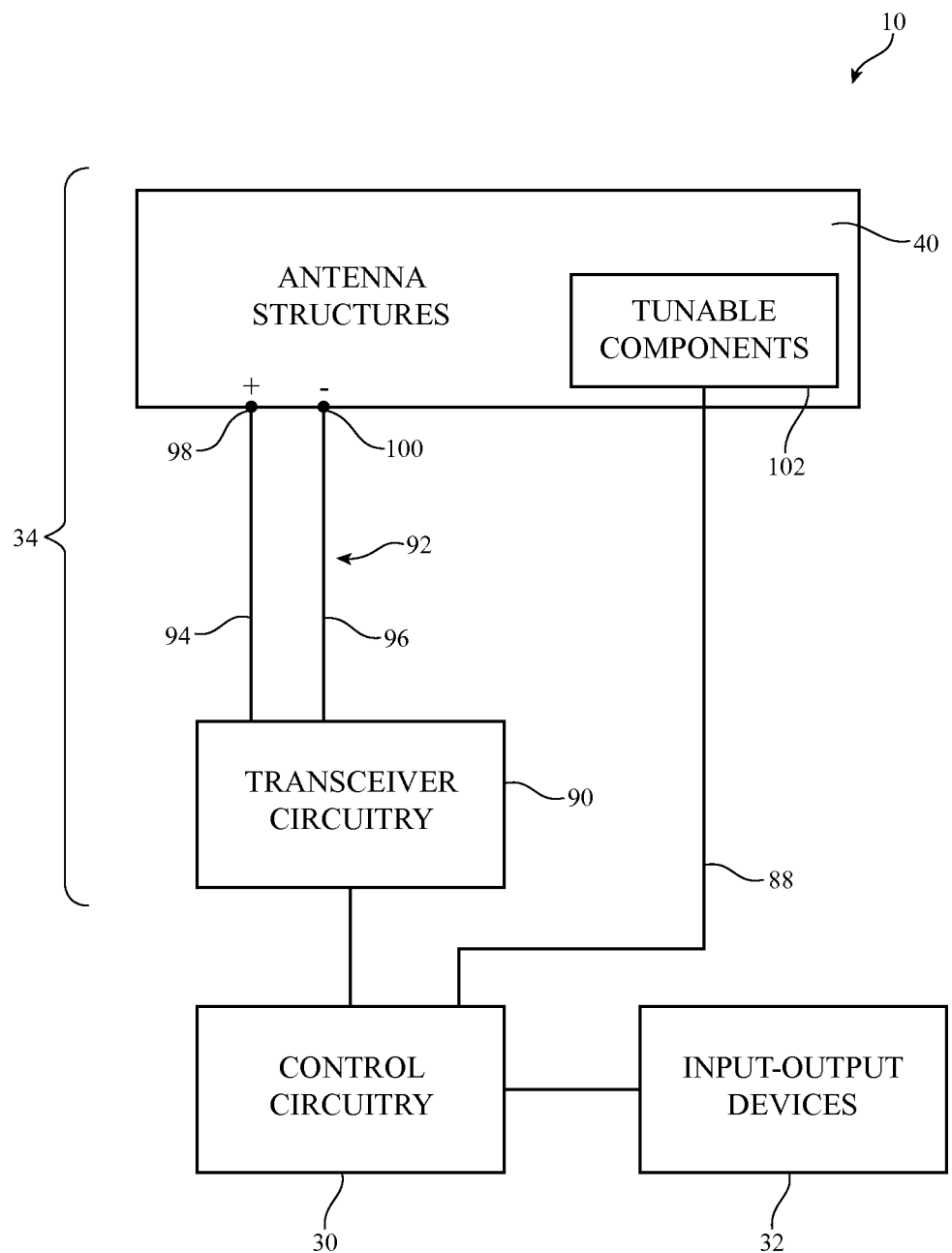
FIG. 3 is a diagram of illustrative wireless circuitry for use in a stylus in accordance with an embodiment.

As shown in FIG. 3, transceiver circuitry 90 in wireless circuitry 34 may be coupled to antenna 40 using paths such as path 92. Wireless circuitry 34 may be coupled to control circuitry 30. Control circuitry 30 may be coupled to input-output devices 32. Input-output devices 32 may supply output from stylus 10 and may receive input from sources that are external to stylus 10.

To provide antenna 40 with the ability to cover communications frequencies of interest, antenna 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna 40 may be provided with adjustable circuits such as tunable components 102 to tune antenna 40 over communications bands of interest. Tunable components 102 may include tunable inductors, tunable capacitors, or other tunable components. Tunable components such as these may be based on switches and networks of fixed components, distributed metal structures that produce associated distributed capacitances and inductances, variable solid state devices for producing variable capacitance and inductance values, tunable filters, or other suitable tunable structures. During operation of stylus 10, control circuitry 30 may issue control signals on one or more paths such as path 88 that adjust inductance values, capacitance values, or other parameters associated with tunable components 102, thereby tuning antenna 40 to cover desired communications bands. Configurations in which antenna 40 is free of tunable components may also be used.

Path 92 may include one or more transmission lines. As an example, signal path 92 of FIG. 3 may be a transmission line having a positive signal conductor such as line 94 and a ground signal conductor such as line 96. Lines 94 and 96 may form parts of a coaxial cable or a microstrip transmission line (as examples). A matching network formed from components such as inductors, resistors, and capacitors may be used in matching the impedance of antenna 40 to the impedance of transmission line 92. Matching network components may be provided as discrete components (e.g., surface mount technology components) or may be formed from housing structures, printed circuit board structures, traces on plastic supports, etc. Components such as these may also be used in forming filter circuitry in antenna 40.

Transmission line 92 may be coupled to antenna feed structures associated with antenna 40. As an example, antenna 40 may form an inverted-F antenna, a slot antenna, a hybrid inverted-F slot antenna or other antenna having an antenna feed with a positive antenna feed terminal such as terminal 98 and a ground antenna feed terminal such as ground antenna feed terminal 100. Positive transmission line conductor 94 may be coupled to positive antenna feed terminal 98 and ground transmission line conductor 96 may be coupled to ground antenna feed terminal 92. Other types of antenna feed arrangements may be used if desired. The illustrative feeding configuration of FIG. 3 is merely illustrative.

Figure 4:
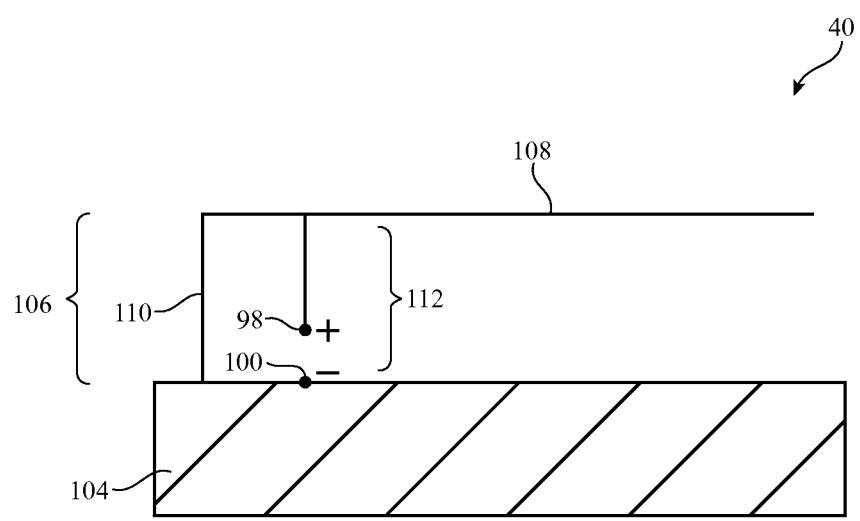
FIG. 4 is a diagram of an illustrative inverted-F antenna for a stylus in accordance with an embodiment.

FIG. 4 is a diagram of illustrative inverted-F antenna structures that may be used in implementing antenna 40 for stylus 10. Inverted-F antenna 40 of FIG. 4 has antenna resonating element 106 and antenna ground 104. Antenna resonating element 106 may have a main resonating element arm such as arm 108. The length of arm 108 may be selected so that antenna 40 resonates at desired operating frequencies. For example, the length of arm 108 may be a quarter of a wavelength at a desired operating frequency for antenna 40 (e.g., 2.4 GHz). Antenna 40 may also exhibit resonances at harmonic frequencies.

Main resonating element arm 108 may be coupled to ground 104 by return path 110. Antenna feed 112 may include positive antenna feed terminal 98 and ground antenna feed terminal 100 and may run parallel to return path 110 between arm 108 and ground 104. If desired, inverted-F antennas such as illustrative antenna 40 of FIG. 4 may have more than one resonating arm branch (e.g., to create multiple frequency resonances to support operations in multiple communications bands) or may have other antenna structures (e.g., parasitic antenna resonating elements, tunable components such as components 102 of FIG. 3 to support antenna tuning, etc.). In mounting antenna 40 in stylus 10, the structures of antenna 40 may be curved. For example, ground 104 and/or resonating element 106 may be formed from metal that wraps around longitudinal axis 26 of stylus 10.

As shown in FIG. 5, antenna 40 may be a planar inverted-F antenna (e.g., arm 108 may be formed from planar metal structures that lie above portions of ground 104. Feed 112 may be formed from an arm that extends downwards from planar element 108 towards ground 104. Return path 110 may be formed from a planar metal wall extends between planar arm 108 and ground 104 in parallel with feed 112.

In the example of FIG. 6, antenna 40 is a monopole having a monopole resonating element 106. Monopole resonating element 106 is formed from a strip of metal such as metal monopole arm 108). Metal monopole arm 108 extends from positive feed terminal 98 away from ground 104 and ground feed terminal 100. The length of monopole arm 108 may be adjusted to cover a frequency range of interest (e.g., the length of monopole element may be a quarter of a wavelength at the operating frequency of interest).

If desired, antenna 40 may be formed from a loop antenna such as loop antenna 40 of FIG. 7. Loop antenna 40 may have a resonating element 106 that is formed from a loop of conductive material extending between positive antenna feed terminal 98 and ground antenna feed terminal 100.

FIG. 8 shows how antenna 40 may be a ring antenna. Ring antenna 40 of FIG. 8 has a positive antenna feed terminal such as feed terminal 98 and a ground antenna feed terminal such as feed terminal 100. Positive antenna feed terminal 98 is coupled to ring antenna resonating element 106 (e.g., a metal structure that extends in a ring around the body of stylus 10, etc.). Ground antenna feed terminal 100 is coupled to ground 104.

Other types of antenna may be used in forming antenna 40 for stylus 10 if desired (e.g., slot antennas, helical antennas, patch antennas, etc.). The configurations of FIGS. 4, 5, 6, 7, and 8 are merely illustrative.

Antenna 40 may be formed from conductive structures such as metal structures. The metal structures of antenna 40 may be metal coating layers, portions of a device housing or other structural metal member, portions of a metal tube, metal foil, wires, or other metal structures.

Figure 9:
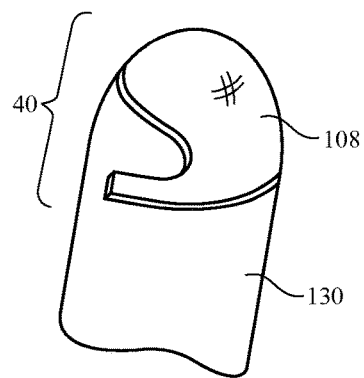
FIG. 9 is a perspective view of an illustrative antenna formed using laser direct structuring techniques in accordance with an embodiment.

In the illustrative configuration of FIG. 9, antenna 40 includes three-dimensional metal arm 108 on three-dimensional (non-planar) dielectric support 130. Dielectric support 130 may be, for example, a support formed from a dielectric such as plastic (e.g., molded plastic). The plastic material that forms support 130 may be provided with metal particles or other filler material that sensitizes support 130 to exposure from laser light. Following exposure to laser light, portions of support 130 that have been exposed to laser light will promote coating with electroplated metal, whereas portions of support 130 that have not been exposed to laser light will not promote electroplating metal growth. With this approach, which may sometimes be referred to as laser direct structuring (LDS), metal structures such as metal antenna arm 108 of FIG. 9 may be deposited using electroplating. The metal antenna structures that are grown in this way can be three-dimensional (i.e., a curved surface such as the curved surface of illustrative support structure 130 of FIG. 9 can be coated with metal). Use of a three-dimensional antenna structure may help create a desired antenna radiation pattern for antenna 40 while accommodating antenna 40 within a housing of a desired shape.

Figure 10:
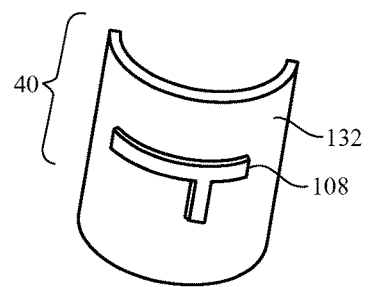
FIG. 10 is a perspective view of an illustrative flexible printed circuit antenna in accordance with an embodiment.

In the example of FIG. 10, metal traces for antenna arm 108 have been deposited and patterned on a flexible substrate such as flexible substrate 132. The metal for forming antenna structures such as arm 108 can be deposited as a blanket metal coating and subsequently patterned using photolithography and metal etching (as an example). Flexible substrate 132 may be a flexible printed circuit formed from a polyimide substrate or a flexible layer of other polymer material. When installed in stylus 10, flexible substrate 132 may wrapped around the elongated body of stylus 10.

Figure 11:
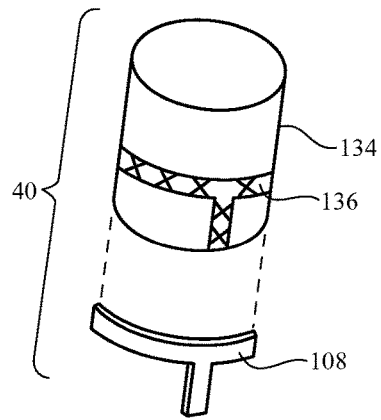
FIG. 11 is a cross-sectional side view of an illustrative antenna with a metal resonating element mounted to a support structure in accordance with an embodiment.

FIG. 11 is an exploded perspective view of an illustrative antenna arm 108 for antenna 40 that is formed from a metal member (e.g., stamped metal foil, etc.) that is attached to dielectric support member 134 using adhesive 136. Support member 134 may be formed from plastic or other dielectric materials and may form a portion of the elongated body of stylus 10.

Figure 12:
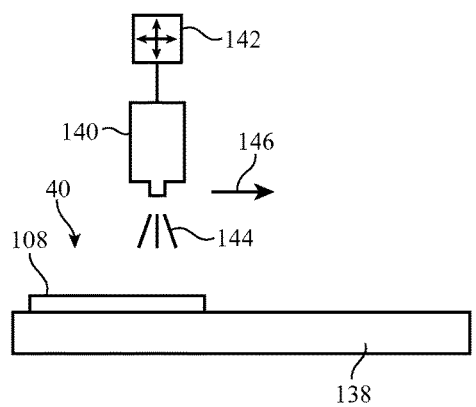
FIG. 12 is a cross-sectional side view of an illustrative antenna formed from printed conductive ink in accordance with an embodiment.

FIG. 12 is a diagram showing how metal antenna arm 108 and other antenna structures may be formed by printing conductive ink 144 onto the surface of dielectric support 138. Dielectric support 138 may be a planar substrate such as a printed circuit substrate or may be a molded plastic support or other structure that has a three-dimensional shape. Ink-jet dispenser 140 may be controlled using computer-controlled positioner 142. When moved in direction 146, dispenser 140 may deposit metal ink or other conductive ink 144 onto support structure 138, thereby forming a desired shape for antenna element 108 of antenna 40. Conductive ink (e.g., binder material that contains metal particles or other conductive particles) may be applied to a support structure using ink-jet printing, screen printing, pad printing, spraying, dipping, dripping, painting, or other suitable deposition techniques.

The antenna metal structure fabrication techniques described in connection with FIGS. 9, 10, 11, and 12 are merely illustrative. Antenna structures may be formed from portions of metal housings (e.g., metal tubes that form structures for the elongated body of stylus 10), internal metal members, metal traces on flexible printed circuits, three-dimensional metal traces (e.g., laser patterned traces) on molded plastic substrates and other three-dimensional dielectric substrates, metal wires, metal foil (e.g., metal foil that has been patterned into the shape of an antenna structure and that is attached to a support structure using adhesive, screws, or other attachment mechanisms).

Antenna 40 may be fed using a cable, a transmission line on a flexible printed circuit, or other suitable feed arrangements.

Figure 13:
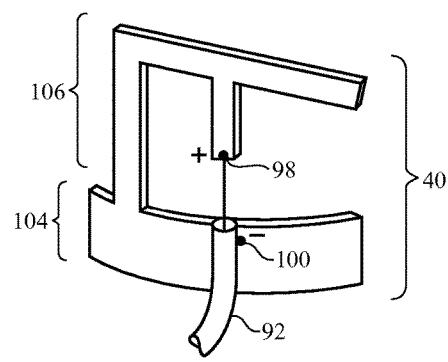
FIG. 13 is a perspective view of an illustrative antenna being fed using a coaxial cable in accordance with an embodiment.

In the example of FIG. 13, transmission line 92 has been implemented using a coaxial cable. An outer conductor in the cable has been shorted to ground 104 at ground feed terminal 100. An inner conductor in the cable has been shorted to positive feed terminal 98. Solder, welds, conductive adhesive, or other conductive coupling mechanisms may be used to couple transmission line 92 to antenna 40.

Figure 14:
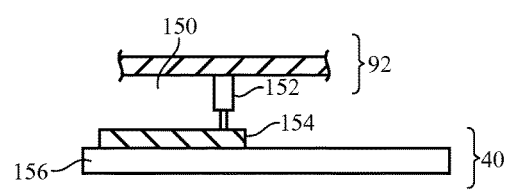
FIG. 14 is a cross-sectional side view of an illustrative antenna being fed using a spring-loaded pin in accordance with an embodiment.

FIG. 14 is a cross-sectional side view of antenna 40 showing another illustrative feed arrangement. In the example of FIG. 14, antenna 40 includes metal trace 154 on dielectric substrate 156. Transmission line 92 includes signal conductor 150. Spring-loaded pin 152 serves as a feed pin. Pin 152 may be soldered or otherwise electrically and mechanically coupled to signal line 150. A spring in pin 152 may cause a protruding portion of pin 152 to press against metal antenna traces 154, thereby completing an antenna feed connection for a positive feed terminal or a ground feed terminal.

Figure 15:
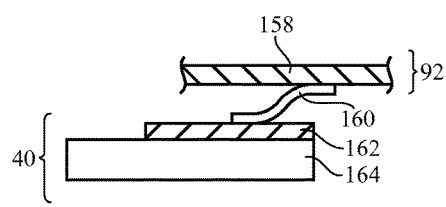
FIG. 15 is a cross-sectional side view of an illustrative antenna being fed using a spring in accordance with an embodiment.

As shown in FIG. 15, a spring such as spring 160 may be used in forming an antenna feed connection. Antenna 40 may include dielectric substrate 164 and antenna traces 162. Transmission line 92 may include conductive signal line 158. Springs such as spring 160 may be coupled to signal line 158 (e.g., using solder, welds, conductive adhesive, fasteners, etc.). Spring 160 may apply a biasing force to antenna trace 162 to form a positive or ground antenna feed connection.

Figure 16:
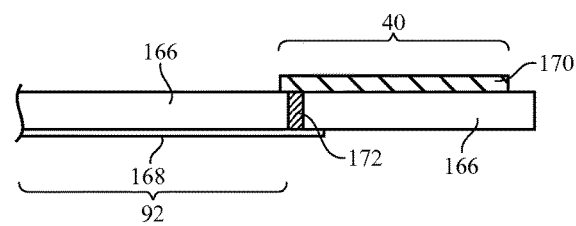
FIG. 16 is a cross-sectional side view of an illustrative antenna being fed using a via that passes through a substrate in accordance with an embodiment.

In the illustrative configuration of FIG. 16, antenna 40 and transmission line 92 are formed from a common substrate. Substrate 166 is formed from a printed circuit or other dielectric and has a first portion in which transmission line conductor 168 is used in forming transmission line 92 and a second portion in which antenna trace 170 is used in forming a resonating element structure and/or ground structure for antenna 40. One or more vias such as via 172 may extend through substrate 166 and may be used in forming positive and ground antenna feed connections.

Figure 17:
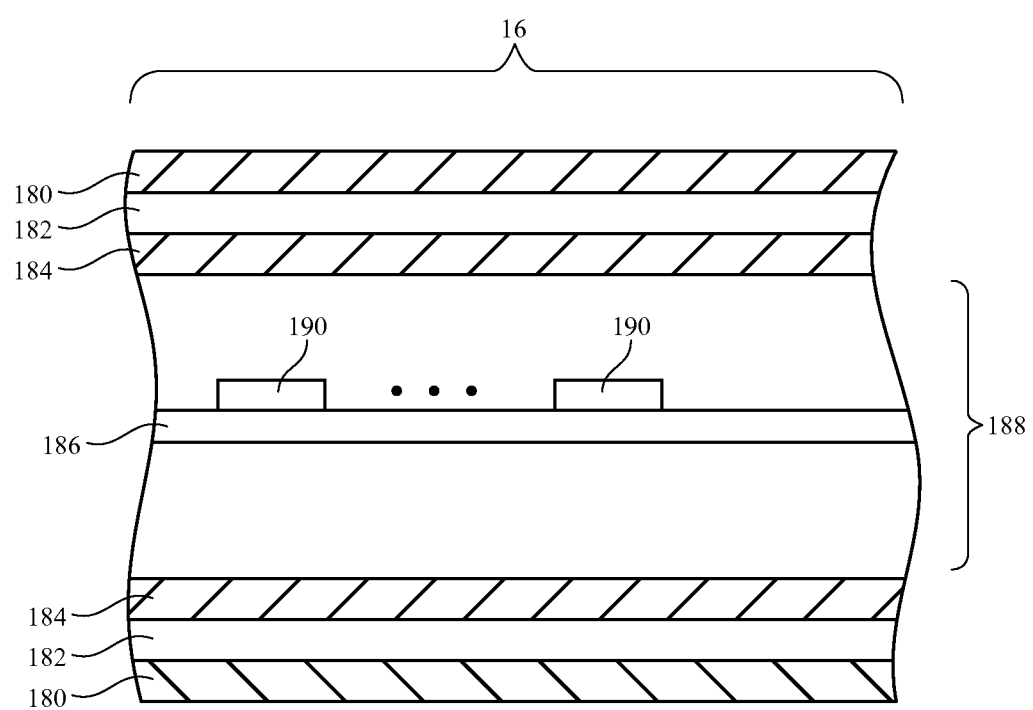
FIG. 17 is a cross-sectional side view of a portion of an elongated body for a stylus in accordance with an embodiment.

The housing of stylus 10 may be formed from metal, plastic, carbon-fiber composites and other fiber composites, glass, ceramic, other materials, and combinations of these materials. A cross-sectional side view of a shaft portion 16 of the elongated body of stylus 10 is shown in FIG. 17. As shown in FIG. 17, electrical components 190 may be mounted within interior cavity 188 of the body of stylus 10. Components 190 may include integrated circuits, sensors, battery structures, connectors, switches, and other circuitry (e.g., control circuitry 30 and/or input-output circuitry 44 of FIG. 1). Components 190 may be mounted on one or more substrates such as substrate 186. Substrate 186 may be a dielectric support structure such as a printed circuit (e.g., a rigid printed circuit formed from a rigid printed circuit board material such as fiberglass-filled epoxy or a flexible printed circuit formed from a flexible sheet of polyimide or other flexible polymer layer).

Interior cavity 188 may be surrounded by one or more layers of material such as layers 180, 182, and 184. These layers of material may form concentric cylindrical tubes and may be formed from metal, plastic, glass, ceramic, other materials, and/or two or more of these materials. As an example, outer layer 180 may form a plastic tube that serves as a cosmetic exterior for stylus 10, intermediate layer 182 may form a metal tube that provides stylus 10 with structural support, and inner layer 184 may form a plastic tube that serves as a support structure. In general, tube 180 may be formed from metal, plastic, or other materials, tube 182 may be formed from metal, plastic, or other materials, and tube 184 may be formed from metal, plastic, or other materials. With another illustrative arrangement, inner tube 184 may be omitted, tube 180 may be formed from metal, plastic, or other materials and tube 182 may be formed from metal, plastic, or other materials. Configurations in which shaft 16 includes a single tube or includes solid portions without significant interior cavity portions may also be used.

Figure 18:
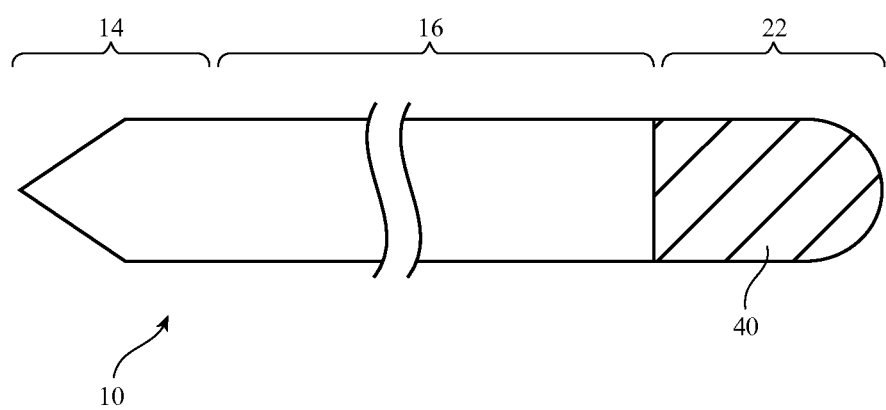
FIG. 18 is a side view of an illustrative stylus having a tip and an opposing end at which an antenna has been formed in accordance with an embodiment.

As shown in the cross-sectional side view of stylus 10 of FIG. 18, antenna 40 may be formed at end 22 of stylus 10. With this type of arrangement, the risk of inadvertently blocking antenna 40 with the hand of a user may be minimized.

Figure 19:
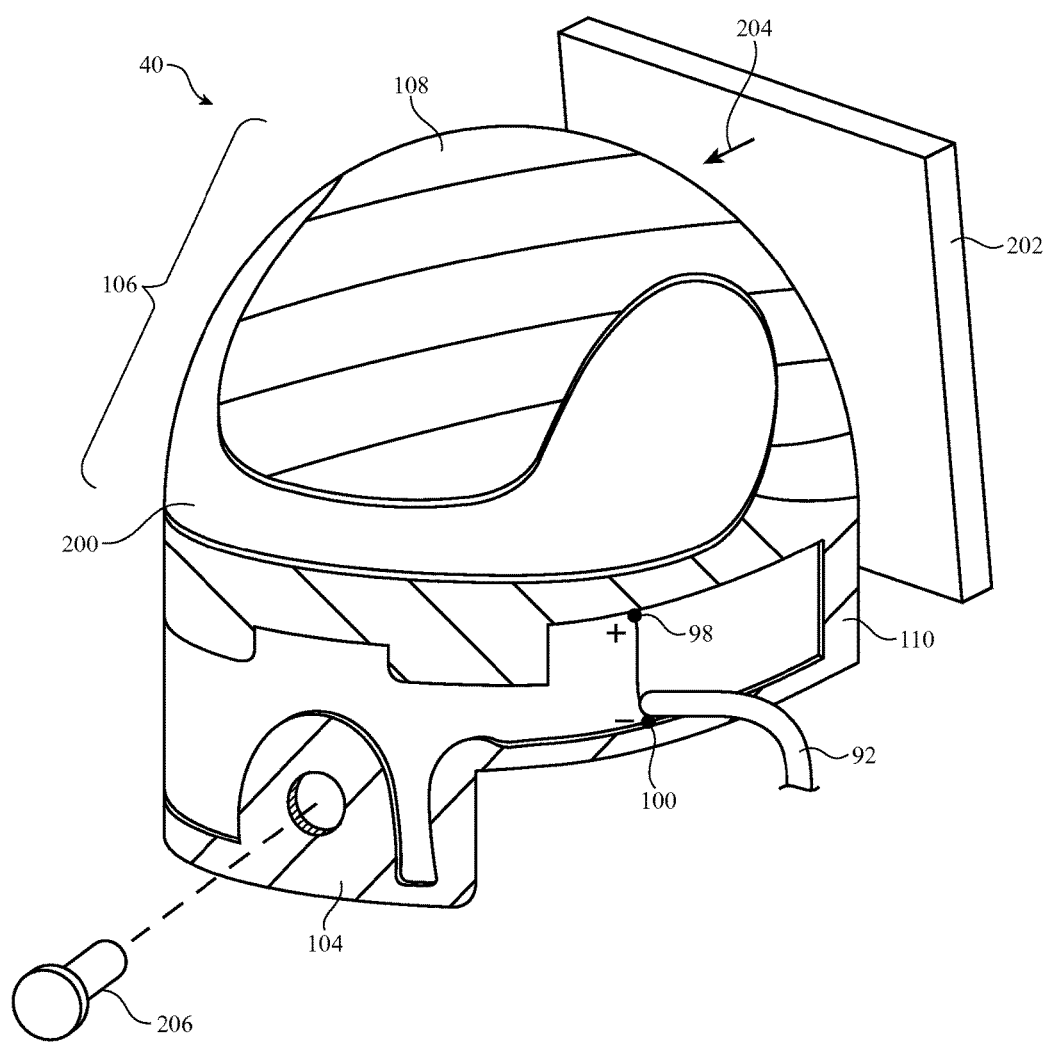
FIG. 19 is a perspective view of an illustrative three-dimensional antenna of the type that may be mounted at the end of the stylus of FIG. 18 in accordance with an embodiment.

A perspective view of an illustrative antenna for mounting at end 22 of stylus 10 of FIG. 18 is shown in FIG. 19. As shown in FIG. 19, antenna 40 may have metal traces formed on a three-dimensional support structure such as molded plastic support 200. Antenna 40 may be an inverted-F antenna and the metal traces may include a portion that forms antenna resonating arm 108 (e.g., arm 108 of FIG. 4), return path 110 (e.g., return path 110 of FIG. 4), and antenna ground 104 (e.g., ground 104 of FIG. 4). Screw 206 and/or other conductive coupling structures may be used to couple ground trace portion 104 to a metal tube in stylus 10 or other antenna ground structures. Transmission line 92 may be implemented using a coaxial cable having a ground conductor coupled to ground terminal 100 on ground 104 and a positive conductor coupled to positive antenna feed terminal 98.

Figure 20:
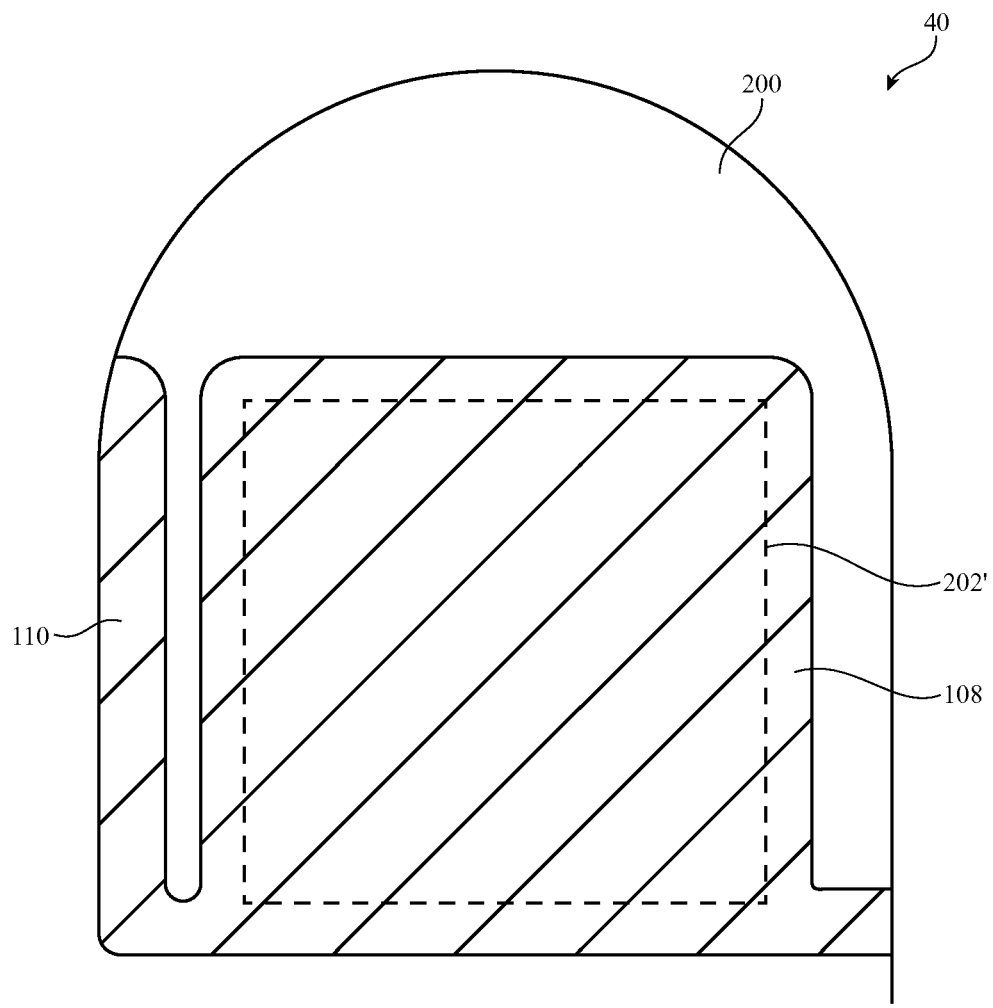
FIG. 20 is a rear view of the antenna of FIG. 19 showing where a conductive structure such as a magnet may be mounted over antenna traces in accordance with an embodiment.

If desired, the rear of antenna 40 may be formed from a metal trace that is sufficiently large to receive a component such as magnet 202 (e.g., when magnet 202 is installed on the rear of antenna 40 in direction 204 using adhesive or other attachment mechanisms). A rear view of antenna 40 of FIG. 19 is shown in FIG. 20. Dashed lines 202' of FIG. 20 show where magnet 202 may be mounted. During operation, antenna currents may flow through magnet 202 (i.e., magnet 202 may form part of the antenna). The upper surface of antenna support structure 200 may have a dome-shaped configuration to accommodate mounting within a domed end portion of stylus 10 or may have other suitable shapes.

Figure 21:
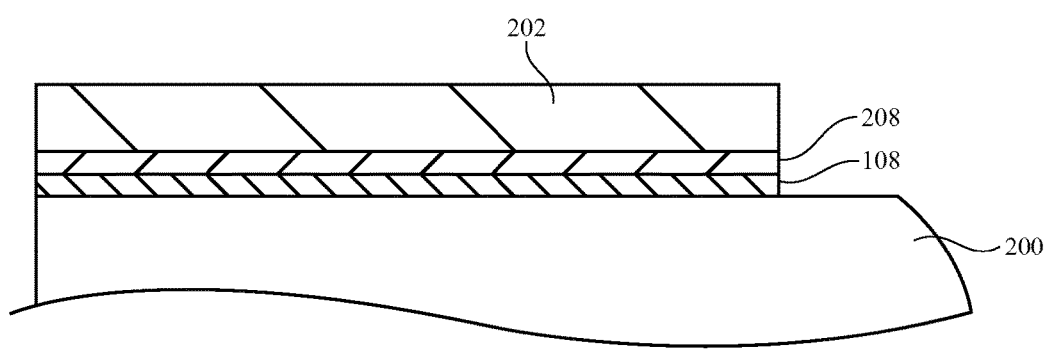
FIG. 21 is a side view of a portion of the antenna of FIG. 19 following attachment of a magnet to antenna traces on the antenna in accordance with an embodiment.

FIG. 21 is a cross-sectional side view of magnet 202 mounted to arm 108 on support structure 200. As shown in FIG. 21, conductive adhesive 208 may be used in mounting magnet 202 to antenna 40. If desired, magnet 202 may be omitted (e.g., when a clip or other structure is present in stylus 10 to help secure stylus 10 when not in use).

Figure 22:
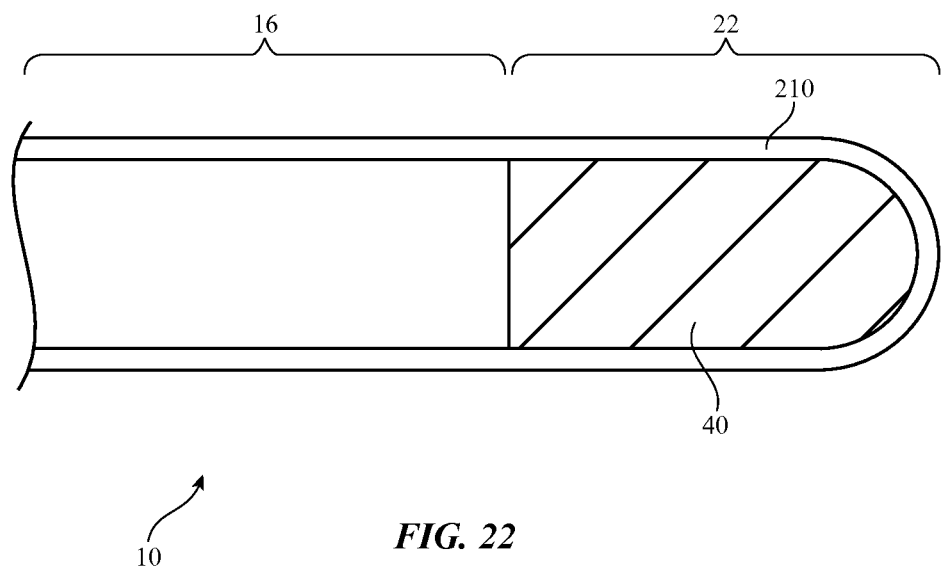
FIG. 22 is a cross-sectional side view of an illustrative stylus having a dielectric covering that covers an antenna located at an end of the stylus in accordance with an embodiment.
Figure 23:
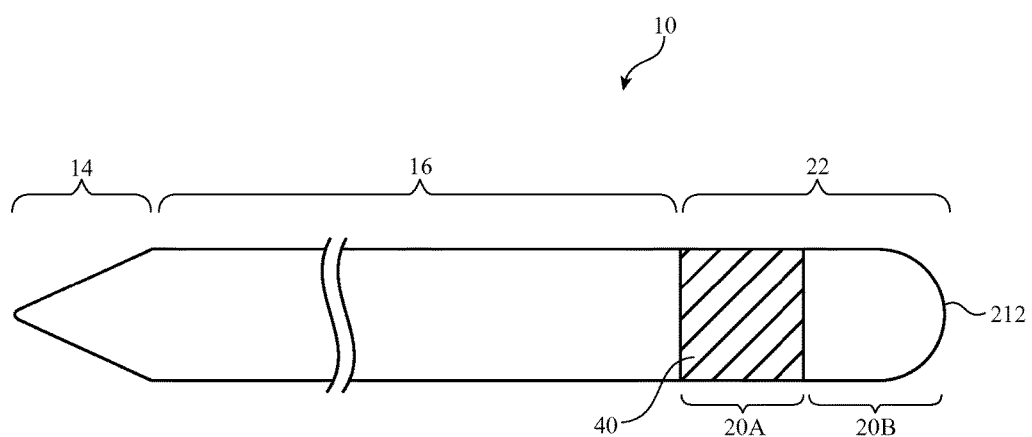
FIG. 23 is a cross-sectional side view of an illustrative stylus having an antenna that is formed at a location that is offset from the end of the stylus in accordance with an embodiment.

As shown in the cross-sectional side view of end 22 of stylus 10 of FIG. 22, an antenna such as antenna 40 of FIG. 19 may be covered with one or more dielectric layers such as stylus housing 210. Housing 210 may be formed from plastic or other radio-transparent material. In the example of FIG. 22, antenna 40 has been formed at the end of stylus 10. If desired, antenna 40 may be located at a position that is offset from the end of stylus 10. As shown in FIG. 23, for example, antenna 40 may be mounted within stylus 10 at a location such as location 20A that is not directly adjacent to the end of stylus 14 (i.e., location 20A is offset from end 212 and portion 20B is interposed between antenna 40 and end 212).

Figure 24:
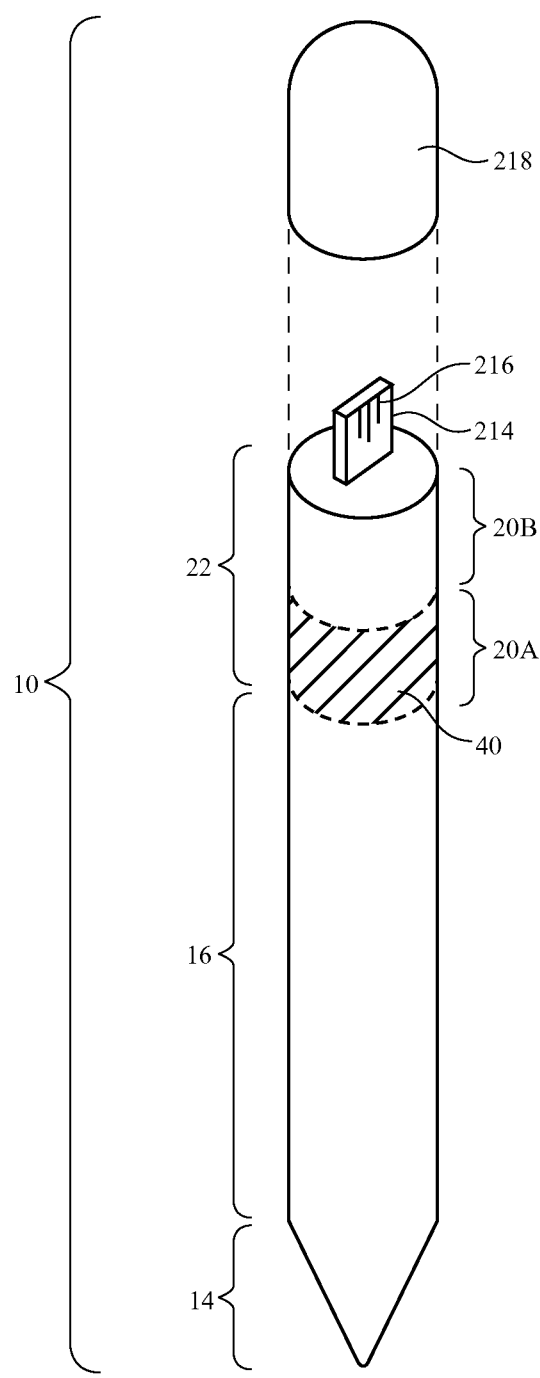
FIG. 24 is an exploded perspective view of an illustrative stylus with a removable cap and an antenna that is formed at a location that is offset from the end of the stylus in accordance with an embodiment.

As shown in FIG. 24, stylus 10 may have a removable cap such a cap 218. Cap 218 may be attached and removed from end 22 of stylus 10. Stylus 10 may have a connector such as connector 214. Connector 214 may have contacts (pins) 216 that mate with a corresponding connector (e.g., a connector on a companion electronic device). Connector 214 may be used to recharge a battery in stylus 10, to convey settings and other information to stylus 10 from external equipment, and/or to convey data or power from stylus 10 to external equipment. Antenna 40 may be located at a position such as position 20A that is recessed from connector 214.

Figure 25:
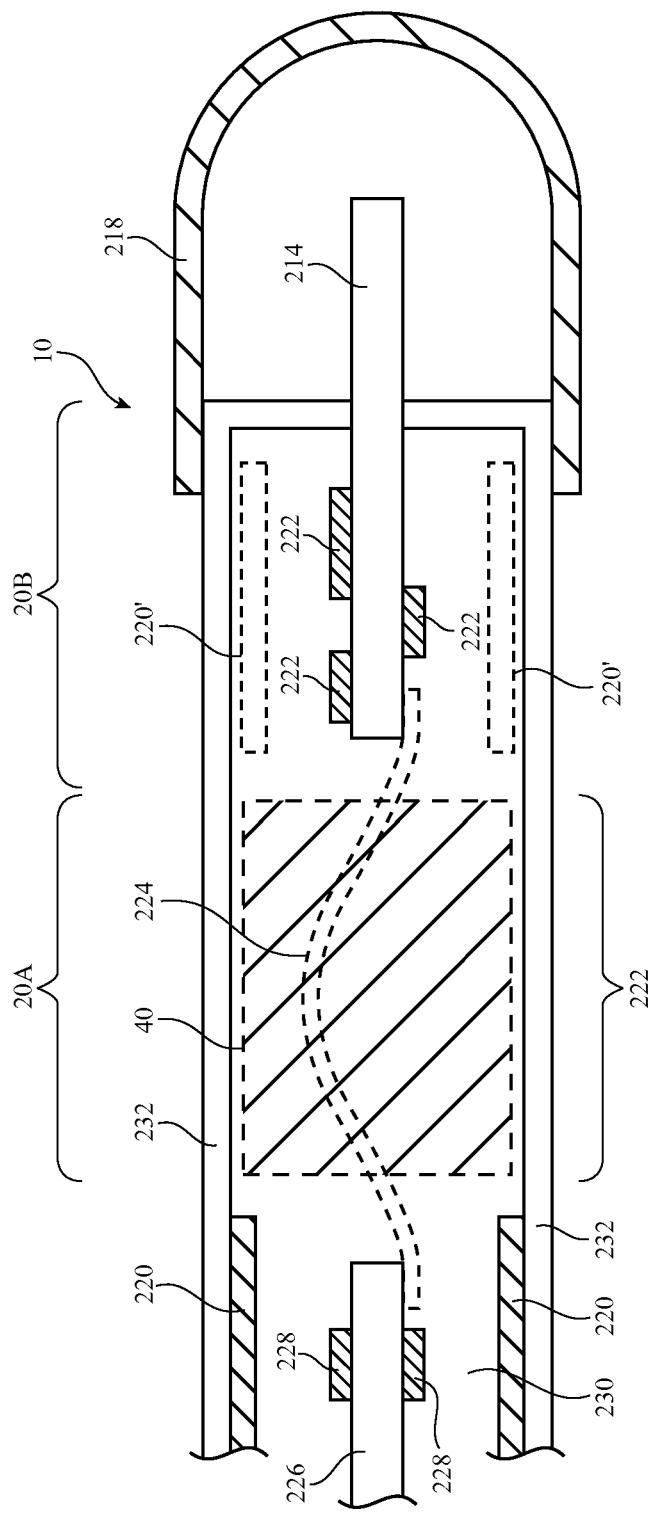
FIG. 25 is a cross-sectional side view of an illustrative stylus with a removable cap and an antenna that offset from the end of the stylus in accordance with an embodiment.

A cross-sectional side view of an illustrative stylus with a cap is shown in FIG. 25. As shown in FIG. 25, stylus 10 may have outer housing 232 to which cap 218 may be attached (e.g., by friction) or detached (e.g., by pulling cap 218 away to expose connector 214). Connector 214 may be formed from a printed circuit or other structure to which support circuitry 222 (e.g., integrated circuits, etc.) may be mounted. A flexible printed circuit or other signal path such as signal path 224 may be used to couple connector 214 and associated connector circuitry 222 to printed circuit 226 and components 228 on printed circuit 226. Components 228 may include circuitry for forming control circuitry 30 and input-output circuitry 44 of FIG. 2.

Antenna 40 may be located in a region such as region 20A that is offset from the end of stylus 10 (e.g., non-antenna region 20B may be interposed between the end of stylus 10 and antenna region 20A).

Metal tube 220 may be mounted within housing 232. In region 20A, metal tube 220 (or most of metal tube 220) may be absent and antenna 40 may be mounted under housing 232. Housing 232 may be a plastic tube that is radio-transparent. By removing metal tube 220 from region 20A (e.g., by forming an opening in tube 220), portion 222 of housing 232 may form an antenna window for antenna 40. Metal tube 220 may be absent from region 20B or portions 220' of metal tube 220 may be located in region 20B.

Figure 26:
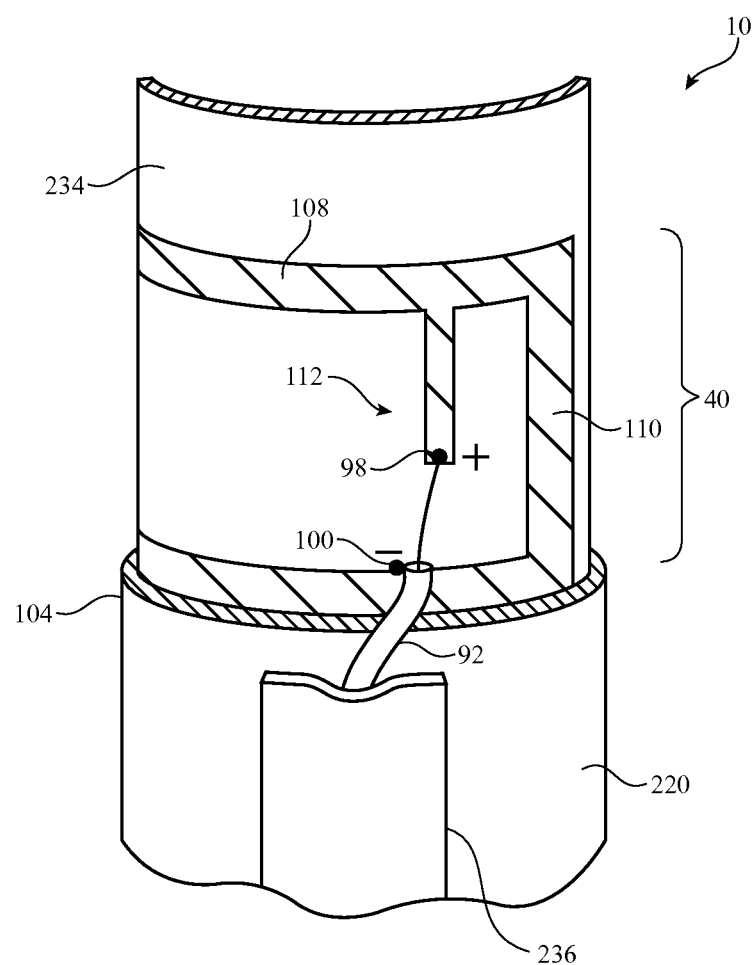
FIG. 26 is a perspective view of an illustrative antenna for a stylus that is being feed with a cable that has been covered with a conductive foam in accordance with an embodiment.

As shown in FIG. 26, antenna 40 of FIG. 25 may be formed from metal traces on a dielectric support structure such as support structure 234. Support structure 234 may be a plastic tube or other dielectric support structure (e.g., an inner tube in a multi-tube arrangement). The antenna traces formed on support 234 may include antenna resonating element arm 108, metal structures for feed 112, a metal trace forming return path 110, and metal traces that couple antenna 40 to ground 104. Transmission line 92 may be a coaxial cable having an outer connector coupled to ground feed terminal 100 and an inner conductor coupled to positive feed terminal 98 (as an example). Metal tube 220 may be used in forming antenna ground 104 and may be shorted to a ground trace in the antenna traces on support 234. If desired, cable 92 may be covered with a strip of conductive foam such as foam 236 or other conductive material (e.g., conductive fabric, metal foil, etc.). This may help ground and shield cable 92.

Figure 27:
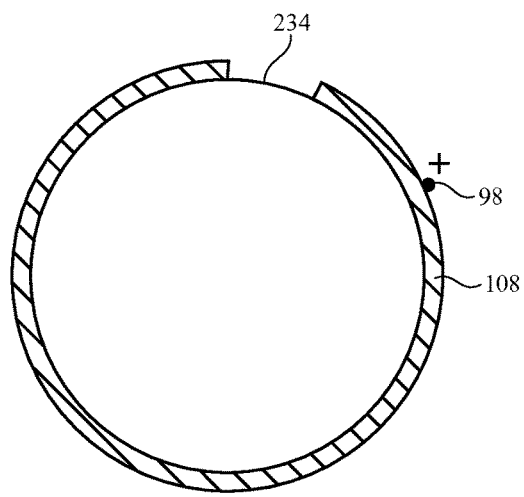
FIG. 27 is a cross-sectional end view of an illustrative stylus antenna with a metal trace that wraps around most of a stylus body in accordance with an embodiment.
Figure 28:
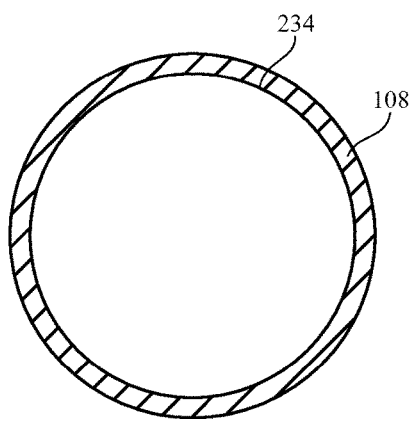
FIG. 28 is a cross-sectional end view of an illustrative stylus antenna with a metal trace that wraps around all of a stylus body in accordance with an embodiment.
Figure 29:
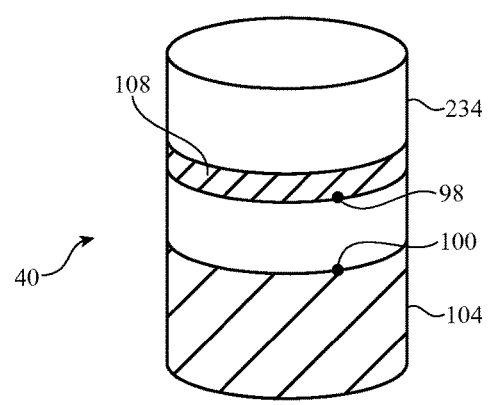
FIG. 29 is a perspective view of an illustrative ring antenna of the type that may be used in forming a stylus antenna in accordance with an embodiment.

The metal traces for antenna 40 may surround some or all of the circumference of stylus 10. FIGS. 27 and 28 are cross-sectional top views of stylus 10 in two different illustrative configurations. In the example of FIG. 27, the metal trace for antenna resonating element arm 108 extends around most but not all of the circumference of support 234. In the example of FIG. 28, the metal trace for antenna resonating element arm (ring) 108 extends entirely around support 234. FIG. 29 shows how the metal trace for antenna resonating element 108 may be configured to form a ring antenna (i.e., a resonating element that extends entirely around support 234 as shown in the top view of FIG. 28). Antennas such as ring antenna 40 of FIG. 29 or the inverted-F antenna of FIG. 26 may be formed in regions of stylus 10 such as region 20A or other suitable regions. Antenna structures may be formed from patterned traces on a plastic support, from metal traces on a printed circuit that is wrapped around a plastic support, from metal foil structures that are attached to a plastic support, metal housing structures, or other suitable metal structures.

Figure 30:
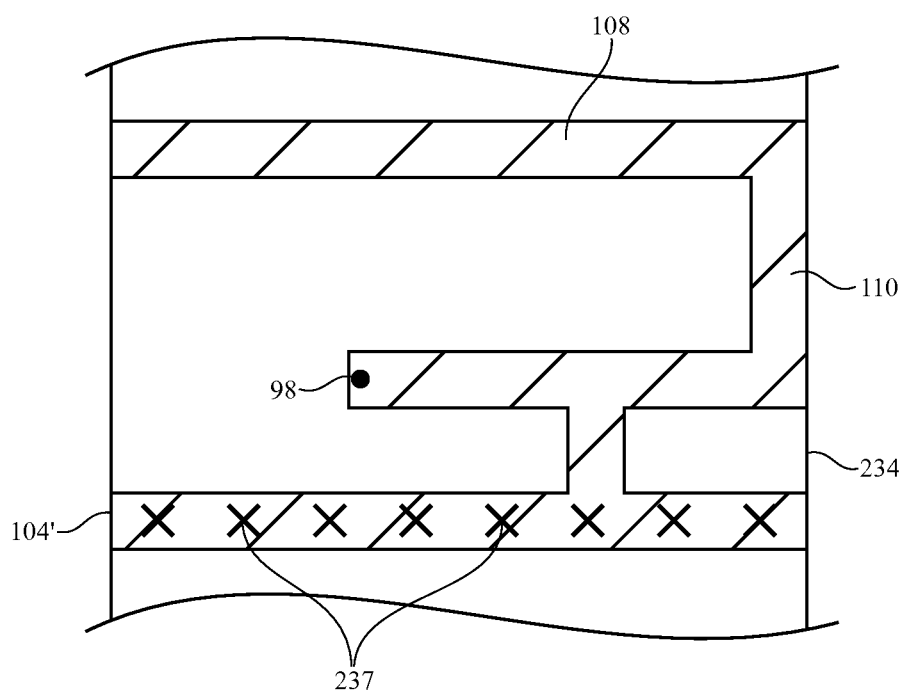
FIG. 30 is a side view of an illustrative antenna trace of the type that may be mounted on the side of a stylus at a location that is offset from the end of the stylus in accordance with an embodiment.

FIG. 30 is a side view of illustrative metal antenna traces for an inverted-F antenna that have been formed on support structure 234. The antenna traces may include traces for forming arm 108, return path 110, feed 112, and a strip of metal such as strip 104' that can be shorted to metal tube 220 (see, e.g., FIG. 26) to form antenna ground using conductive adhesive 237.

Figure 31:
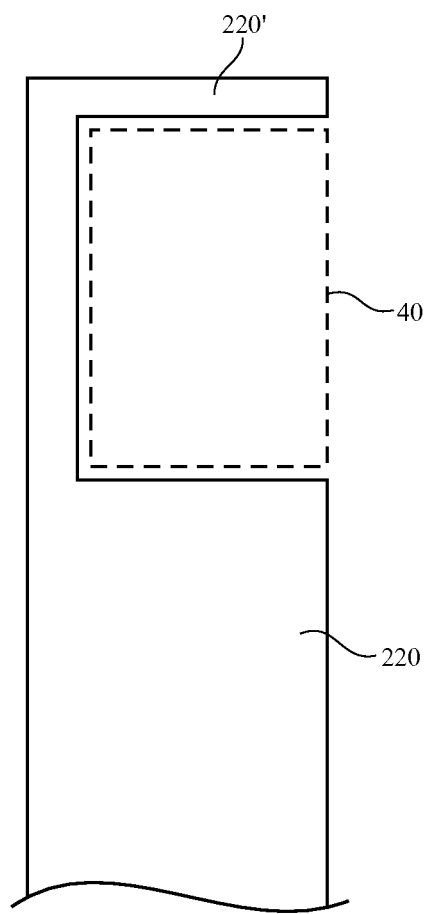
FIG. 31 is a cross-sectional side view of an illustrative stylus having a metal body structure with an opening for an antenna in accordance with an embodiment.
Figure 32:
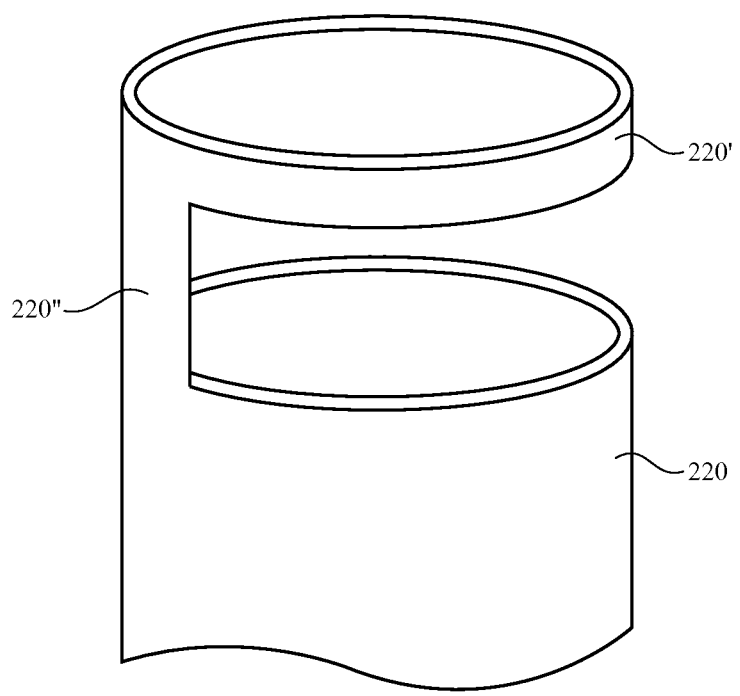
FIG. 32 is a perspective view of the metal body structure of FIG. 31 in accordance with an embodiment.

As shown in FIG. 31, metal tube 220 may have a cylindrical shape with a cut out portion forming an opening to accommodate antenna 40. A perspective view of metal tube 220 of FIG. 31 is shown in FIG. 32. As shown in FIG. 32, vertical portion 220" may be used to attach ring-shaped upper portion 220' to main portion 220.

Figure 33:
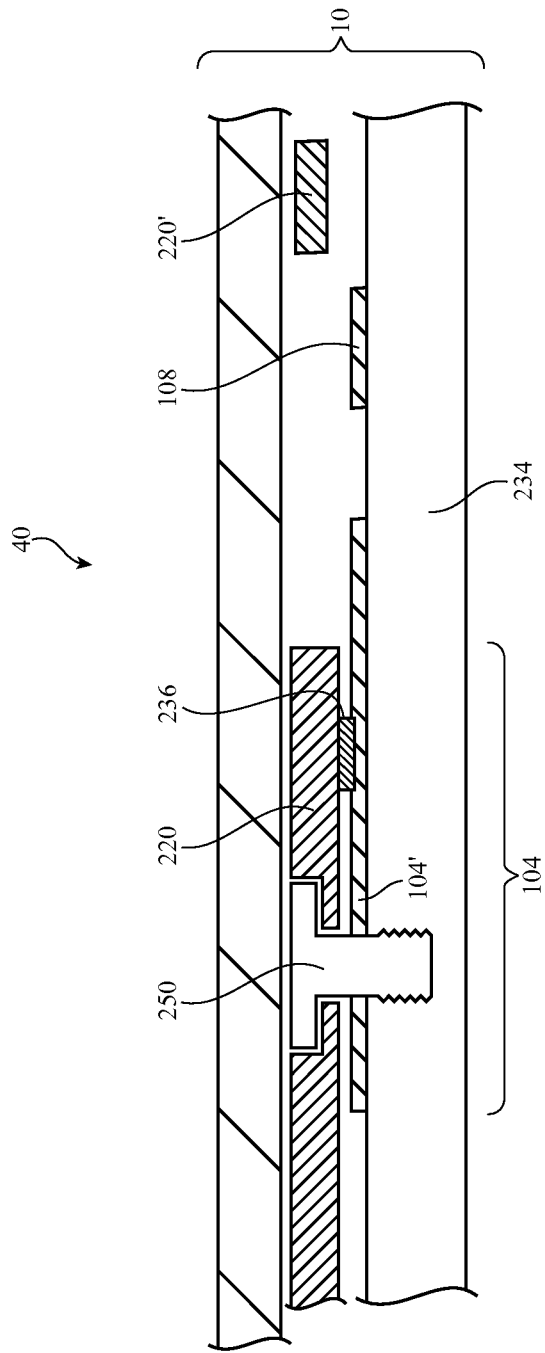
FIG. 33 is a cross-sectional side view of a portion of a stylus body having antenna structures that are shorted to a metal tube in the stylus body in accordance with an embodiment.

A cross-sectional side view of a wall portion of stylus 10 in the vicinity of antenna 40 is shown in FIG. 33. In the example of FIG. 33, dielectric support 234 has the shape of an inner tube. Antenna traces for antenna 40 such as ground trace 104' and resonating element arm 108 may be formed on support structure 234. In ground region 104, metal tube 220 is shorted to trace 104' using conductive adhesive 237. Screw 250 may be used to attach metal tube 220 to support 234 and may help form an electrical connection between tube 220 (which can serve as antenna ground) and ground trace 104'. Plastic housing tube 232 may cover antenna 40 and may serve as the outermost layer of stylus 10.

Figure 34:
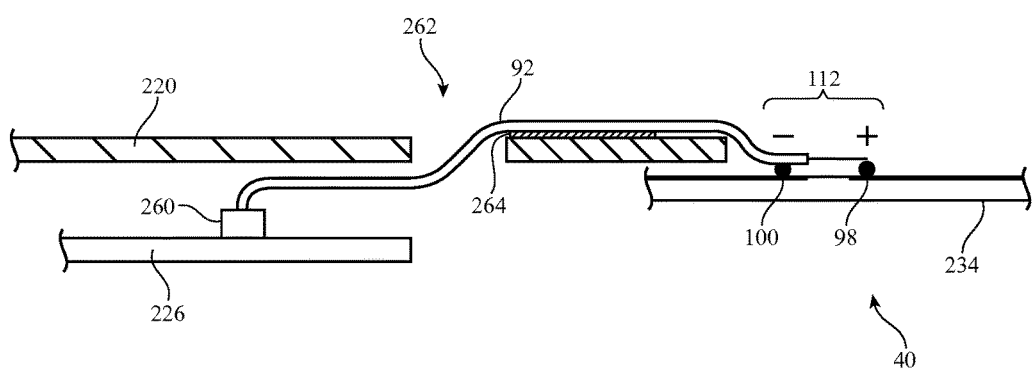
FIG. 34 is a cross-sectional side view of a portion of a stylus in which an antenna is being fed using a cable that exits from the interior of a metal tube before being coupled to a feed for the antenna in accordance with an embodiment.

As shown in FIG. 34, printed circuit 226 of FIG. 25 may have a connector such as connector 260. Coaxial cable 92 may be coupled to radio-frequency transceiver circuitry on board 226 using connector 260. Cable 92 may pass through opening 262 in metal tube 220 and may be coupled to antenna feed 112 through the opening in tube 220 that accommodates antenna 40. Conductive adhesive 264 may help short the ground conductor of cable 92 to metal tube 220. Cable 92 may be covered with a strip of conductive material such as conductive foam 236 of FIG. 26 or conductive fabric, metal, or other material.

The foregoing is merely illustrative and various modifications can be made by those skilled in the art without departing from the scope and spirit of the described embodiments. The foregoing embodiments may be implemented individually or in any combination.

What is claimed is:

1. A computer stylus, comprising:
    an elongated body having a tip and an opposing end coupled by a shaft that extends along a longitudinal axis and that has a circumference;
    an antenna that wraps around at least part of the circumference; and
    a connector at the opposing end that has a plurality of contact pads, wherein the antenna is located between the connector and the tip, the shaft includes a metal tube that extends from the tip to the antenna, and the shaft includes a plastic outer tube that covers the antenna and that extends from the tip to the opposing end.

2. The computer stylus defined in claim 1 wherein the antenna comprises a flexible printed circuit wrapped around a plastic tube.

3. The computer stylus defined in claim 1 wherein the antenna comprises a metal antenna resonating element trace on a plastic support structure.

4. The computer stylus defined in claim 3 further comprising a metal tube that forms at least part of the shaft.

5. The computer stylus defined in claim 4 wherein the antenna has a metal trace that is shorted to the metal tube by conductive adhesive.

6. The computer stylus defined in claim 5 further comprising a coaxial cable, wherein the metal tube has an opening through which the coaxial cable passes.

7. The computer stylus defined in claim 6 wherein the antenna has a feed and wherein the coaxial cable is coupled to the feed.

8. The computer stylus defined in claim 7 further comprising a strip of conductive foam that covers at least part of the coaxial cable.

9. The computer stylus defined in claim 1 wherein the antenna comprises a ring antenna having a metal antenna resonating element that wraps entirely around the circumference.

10. A computer stylus, comprising:
an elongated body having a tip and an opposing end coupled by a shaft that extends along a longitudinal axis; and
an antenna at the opposing end that is formed from metal traces on a dome-shaped plastic support.

11. The computer stylus defined in claim 10 wherein the antenna includes a magnet.

12. The computer stylus defined in claim 11 wherein the antenna comprises an inverted-F antenna.

13. The computer stylus defined in claim 12 wherein the antenna comprises an antenna ground trace and an antenna resonating element trace coupled by a return path trace.

14. The computer stylus defined in claim 13 wherein the antenna resonating element trace is electrically coupled to the magnet and antenna currents pass through the magnet.

15. The computer stylus defined in claim 14 further comprising:
an antenna feed coupled to the antenna resonating element trace and the antenna ground trace; and
a metal tube that forms at least part of the shaft, wherein the metal tube is shorted to the antenna ground trace.

16. The computer stylus defined in claim 15 further comprising a screw that is shorted to the antenna ground trace and a coaxial cable that is coupled to the antenna feed.

17. The computer stylus defined in claim 10, wherein the antenna comprises an antenna ground trace and an antenna resonating element trace coupled by a return path trace.

18. A computer stylus, comprising:
an elongated body having a tip and an opposing end coupled by a shaft that extends along a longitudinal axis and that has a circumference;
a connector at the opposing end that has a plurality of connector contact pads;
electrical components in the shaft that are coupled to the connector by a signal path; and
an antenna in the shaft between the electrical components and the connector, wherein the shaft includes a metal tube with an opening in which the antenna is mounted and includes a plastic outer tube that covers the metal tube and that covers the antenna in the opening.

19. The computer stylus defined in claim 18 wherein the antenna comprises an inverted-F antenna having a resonating element arm, a ground that is coupled to the metal tube by conductive adhesive, and a return path that extends between the resonating element arm and the ground.

20. The computer stylus defined in claim 19 wherein the antenna comprises a feed, the computer stylus further comprising a coaxial cable coupled to the feed.

21. The computer stylus defined in claim 20 wherein the metal tube has an additional opening and wherein the coaxial cable passes through the additional opening.

22. The computer stylus defined in claim 21 further comprising a strip of conductive foam that covers at least some of the coaxial cable.

23. The computer stylus defined in claim 22 further comprising a removable cap that covers the connector.

24. The computer stylus defined in claim 23 further comprising an inner plastic tube that supports the antenna in the opening, wherein the antenna comprises metal traces on the inner plastic tube.

* * * * *